United States Patent
Chien et al.

(10) Patent No.: US 7,738,451 B2
(45) Date of Patent: Jun. 15, 2010

(54) METHOD AND DEVICE FOR FLEXIBLE BUFFERING IN NETWORKING SYSTEM

(75) Inventors: Chih-Feng Chien, Hsinchu (TW); Chun-Chang Huang, Changhua County (TW)

(73) Assignee: Faraday Technology Corp., Hsin-Chu (TW)

(*) Notice: Subject to any disclaimer, the term of this patent is extended or adjusted under 35 U.S.C. 154(b) by 898 days.

(21) Appl. No.: 11/160,632

(22) Filed: Jul. 1, 2005

(65) Prior Publication Data

US 2007/0002880 A1   Jan. 4, 2007

(51) Int. Cl.
H04L 12/50 (2006.01)
H04L 12/28 (2006.01)
G06F 15/167 (2006.01)
G06F 12/00 (2006.01)

(52) U.S. Cl. ............... 370/381; 370/389; 370/412; 709/214; 711/1

(58) Field of Classification Search .......... 370/412–416
See application file for complete search history.

(56) References Cited

U.S. PATENT DOCUMENTS

| | | | |
|---|---|---|---|
| 7,092,360 B2* | 8/2006 | Saint-Hilaire et al. | 370/241 |
| 7,307,998 B1* | 12/2007 | Wang et al. | 370/412 |
| 2001/0007565 A1* | 7/2001 | Weng et al. | 370/429 |
| 2002/0059637 A1* | 5/2002 | Rakib | 725/119 |
| 2003/0026206 A1* | 2/2003 | Mullendore et al. | 370/230 |
| 2004/0047367 A1* | 3/2004 | Mammen | 370/472 |
| 2005/0254488 A1* | 11/2005 | Huang | 370/389 |
| 2006/0077993 A1* | 4/2006 | Pereira et al. | 370/412 |

\* cited by examiner

*Primary Examiner*—Huy D Vu
*Assistant Examiner*—Brandon Renner
(74) *Attorney, Agent, or Firm*—Winston Hsu

(57) ABSTRACT

A method and device for flexible, dynamic and optimal buffering in a networking system are provided. Sizes of incoming packets are recognized and the packets are buffered into buffers of appropriate sizes. Usage times of buffers are counted, and during an idle state of the networking system, buffer number and descriptor number are re-calculated based on usage times. Then, buffers and descriptors are re-allocated based on the re-calculated number. By re-allocation, buffer sets with higher usage times are allocated with more buffers, and vice versa, so memory waste is lowered and the overall performance of the networking system is improved.

13 Claims, 6 Drawing Sheets

METHOD AND DEVICE FOR FLEXIBLE BUFFERING IN NETWORKING SYSTEM

BACKGROUND OF THE INVENTION

1. Field of Invention

The present invention relates to a method and device for flexible buffering in a networking system. More particularly, the present invention relates to a method and device for flexible buffering in a networking system by dynamically and optimally reallocating buffer and descriptor number.

2. Description of Related Art

The advent of networking systems has given rise to a number of devices that connect networking systems to packet-switched data network, such as the Internet, LAN (local area network) or wireless network. These devices typically include interfaces, for example a network interface card (interface unit), for the networking systems and the data network for buffering packets of data between the networking systems and the data network. The buffer memory in these interfaces allows data received from the data network to be transmitted to the networking systems.

FIG. 1 shows a block diagram of a conventional networking system 100. As shown in FIG. 1, the conventional networking system 100 at least includes a processor (for example, a central processing unit (CPU) or a microprocessor) 101, a main memory 102 and an interface unit (for example, a network interface card, NIC) 106. A descriptor group 103, a descriptor buffer group 104 and a socket buffer 105 are allocated in the main memory 102. The interface unit 106 at least includes a media access control (MAC) controller 107, which comprises an FIFO (first in first out) buffer 108. The descriptor group 103, the descriptor buffer group 104 and the socket buffer 105 are predetermined and allocated by operation system (OS). In some cases, the descriptor buffer group is allocated from the socket buffer 105; in other words, the socket buffer 105 includes the descriptor buffer group.

FIG. 2 shows the descriptor group 103 and the descriptor buffer group 104. There are nine descriptors D 1, D 2 . . . and D 9 in the descriptor group 103. A descriptor is a data structure which records/points start address and size of the buffer in the descriptor buffer 104. Each descriptor is chained one next to another and the last one is chained to the first one to form a "ring". The descriptor buffer group 104 is divided into nine descriptor buffers DB 1, DB 2 . . . and DB 9, all in 1,024 bytes. One descriptor points to one descriptor buffer. For example, the descriptor D 1 points to the descriptor buffer DB 1, and so on.

Now please refer to FIG. 1 and FIG. 2 for an explanation of how the interface unit 106 receives packet of data from a data network 109 and forwards the received packet to the main memory 102.

When the packet is input from the data network 109, it is put into the FIFO 108 of the MAC controller 107. Then, the MAC controller 107 fetches one or more available descriptors D 1~D 9 in the descriptor group 103, based on the size of the packet. If the packet is longer than the size of one buffer, then the packets are stored in two or more descriptor buffers and the MAC controller 107 has to fetch two or more descriptors. The descriptor is not available if the descriptor buffer pointed by the descriptor still stores the packet to be accessed by the processor 101 and is not released yet. The MAC controller 107 moves the packet in the FIFO 108 to the descriptor buffer(s) pointed by the available descriptors. If the descriptor buffer is allocated from the socket buffer, the processor 101 accesses the packet in the descriptor buffer and then releases the descriptor buffer and accordingly the corresponding descriptor becomes available. If the descriptor buffer is not allocated from the socket buffer, then the packet is moved again from the descriptor buffer into the socket buffer and the processor 101 accesses the packet from the socket buffer.

Although it is easy for the conventional networking system to implement the reception of packet from the data network 109, there are still some disadvantages. First, the system lacks sensibility to packet size, which leads to memory waste or redundant fetch of descriptors. When the size of the input packet is much smaller than the buffer size, only a few portion of buffer is used and the remaining space is wasted. For example, if the input packet has a size of 24 bytes, then the remaining 1000 (1024−24=1000) bytes of descriptor buffer are wasted because only one packet is allowed to be stored in one descriptor buffer at one time. On the other hand, if the input packet has a size larger than the size of the descriptor buffer, the MAC controller needs to fetch the next descriptor (s) and get more descriptor buffer(s) to store this long packet. For example, if the long packet is of 2,500 bytes, then the MAC controller needs to fetch three descriptors, for example D 2~D 4, and get three descriptor buffers (DB 2~DB 4) with a total of 3,072 bytes to store this long packet. More descriptor fetch means more fetch cycles. Besides, if the descriptor buffer group 104 is not allocated from the socket buffer 105, which is used by OS kernel, additional memory copy is required. Memory copy means packets in the descriptor buffer group 104 are copied into the socket buffer 105. Memory copy increases burdens of the networking system.

Therefore, a new method and device for flexible buffering in networking systems is desired, which would make efficient use of the descriptor buffer and prevent redundant descriptor fetch without increasing burdens of the networking system.

SUMMARY OF THE INVENTION

Accordingly, at least one objective of the present invention is to provide a method and device for flexible buffering in a networking system, which has enough sensibility to packet size.

Another objective of the present invention is to provide a method and device for flexible buffering in a networking system, capable of allocating more buffers in a buffer set with more access/usage times and fewer buffers in a buffer set with fewer access/usage times, to enhance overall system performance.

According to one embodiment of the present invention, a method for flexible buffering in a networking system is provided. In the method, several buffer sets are allocated, while buffers in one buffer set have a different size from buffers in another buffer set. Upon receipt of input packets, packets are stored into buffers based on the packet size. Usage times of the buffer sets are counted, and then the buffer sets are re-allocated based on the usage times.

In another embodiment of the present invention, a networking system with flexible buffering is provided. In the system, a main memory is allocated with several buffer sets having buffers of different sizes, and a networking controller receives and buffers input packets into buffers based on the packet size. When the networking system is idling, buffer number in the buffer sets are recalculated based on the usage times of the buffer sets, and the buffer sets are redefined based on the recalculated buffer number.

In still another embodiment of the present invention, a networking interface in a networking system with a main memory is provided. The interface receives and moves packets to the main memory which is allocated with several buffer sets having buffers of different sizes. The main memory further allocates several descriptor sets pointing to buffer sets. In the networking interface, a networking controller receives and buffers input packets into the buffers based on the packet size. The networking controller includes a status register, indicating whether packets are stored in the buffers, and a counter, counting usage times of the buffer sets. The networking controller re-calculates the descriptor number in the descriptor sets and buffer number in the buffer sets based on values of the counter when the networking system is idling, and the descriptor sets and the buffer sets are re-allocated based on the re-calculated number.

With the present method and device for flexible, dynamic and optimal buffering in a networking system, buffer sets with higher usage times are allocated with more buffers, and buffer sets with lower usage times are allocated with fewer buffers. According to the invention, memory waste and redundant descriptor fetch are lowered, so the overall performance of the networking system is improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
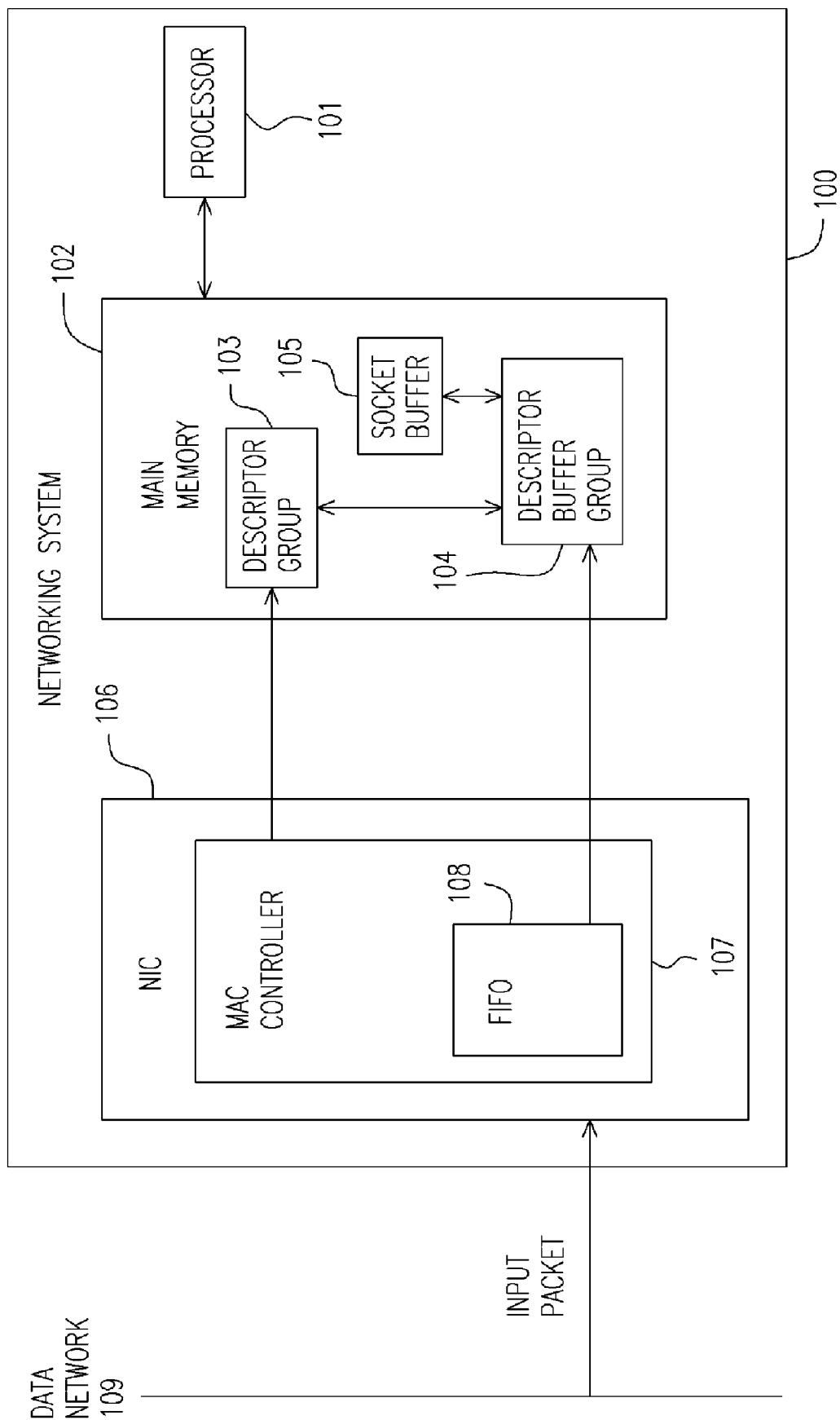
FIG. 1 is a block diagram of a conventional networking system.
Figure 2:
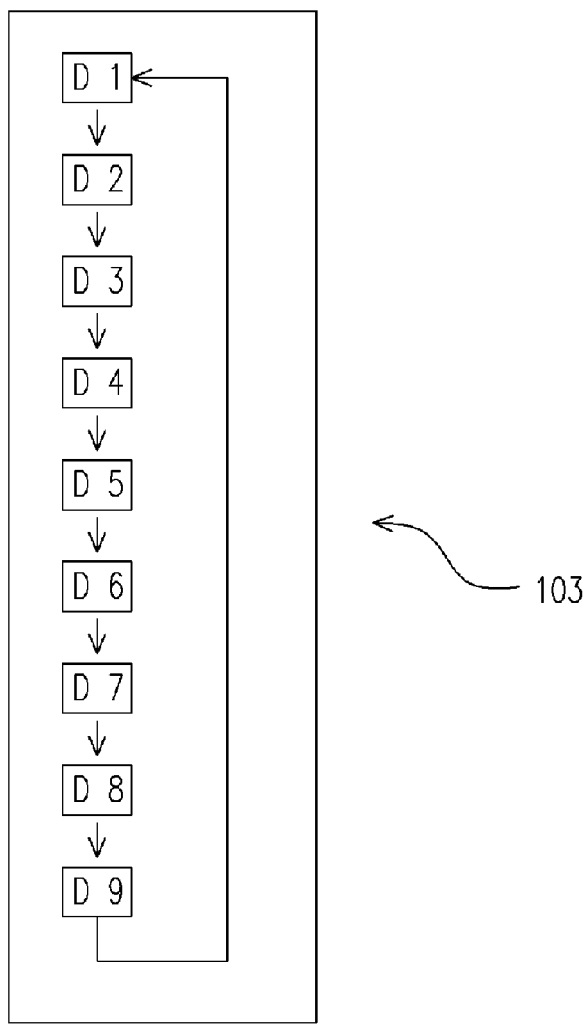
FIG. 2 shows the descriptor group and the descriptor buffer group used in FIG. 1.

Reference will now be made in detail to the present embodiments of the invention, examples of which are illustrated in the accompanying drawings. Wherever possible, the same reference numbers are used in the drawings and the description to refer to the same or like parts.

Figure 3:
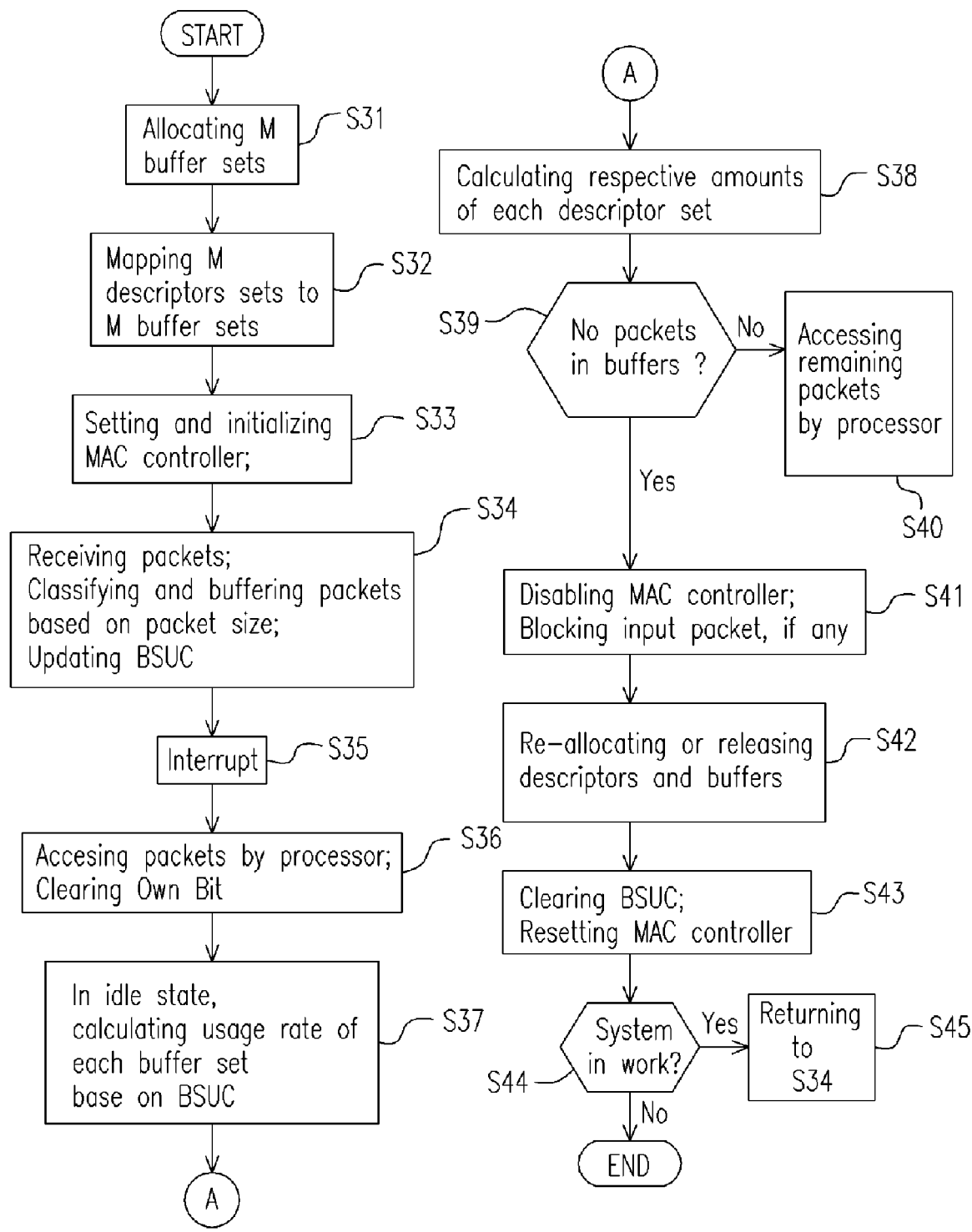
FIG. 3 shows a flow chart for flexible buffering according to an embodiment of the present invention.
Figure 4:
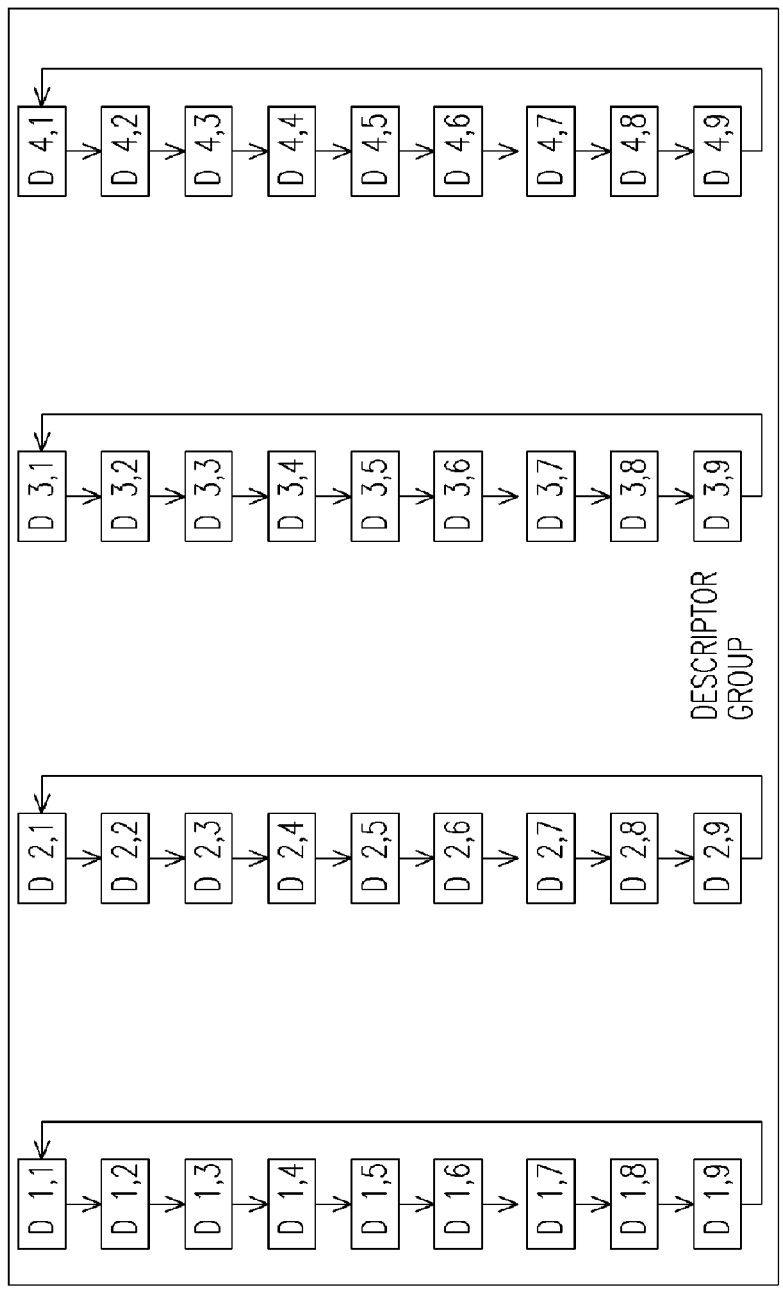
FIG. 4 shows initial states of a descriptor group and a descriptor buffer group according to an embodiment of the present invention.
Figure 5:
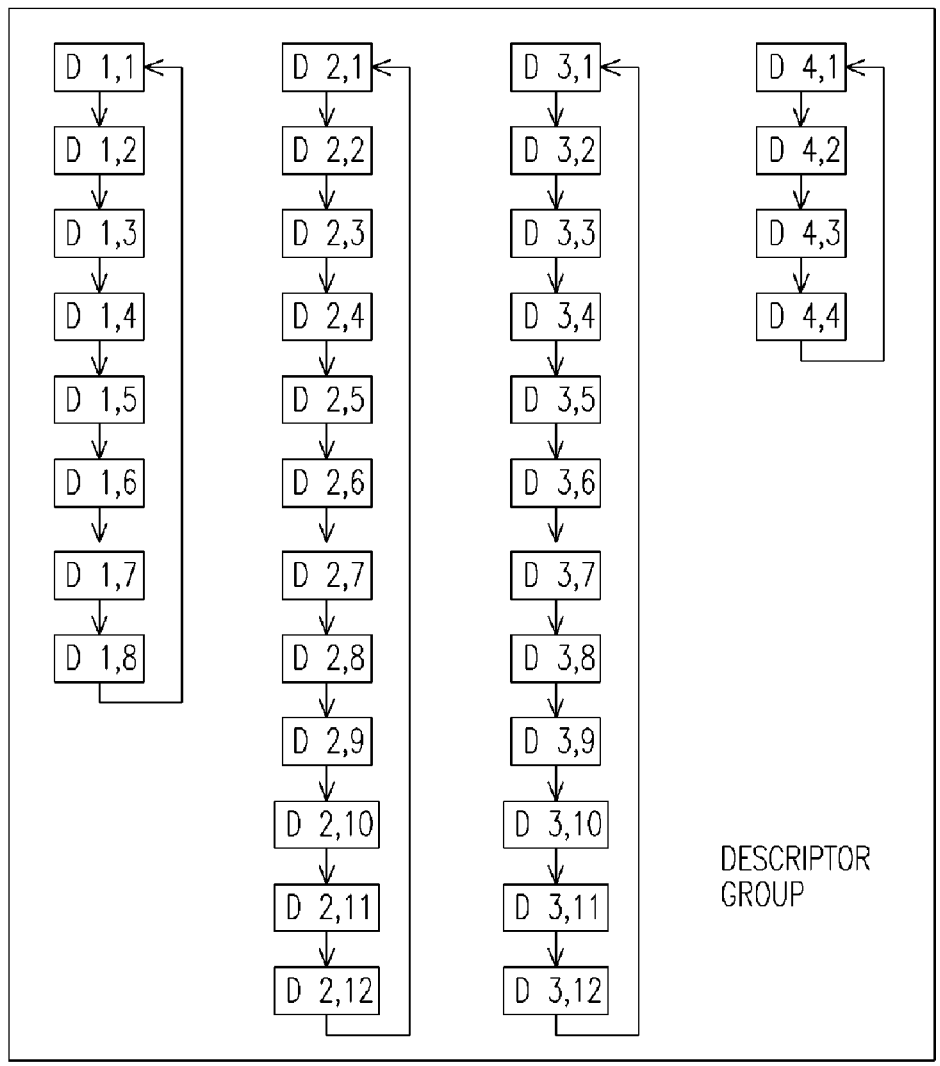
FIG. 5 shows reallocated states of the descriptor group and the descriptor buffer group according to an embodiment of the present invention.
Figure 5:
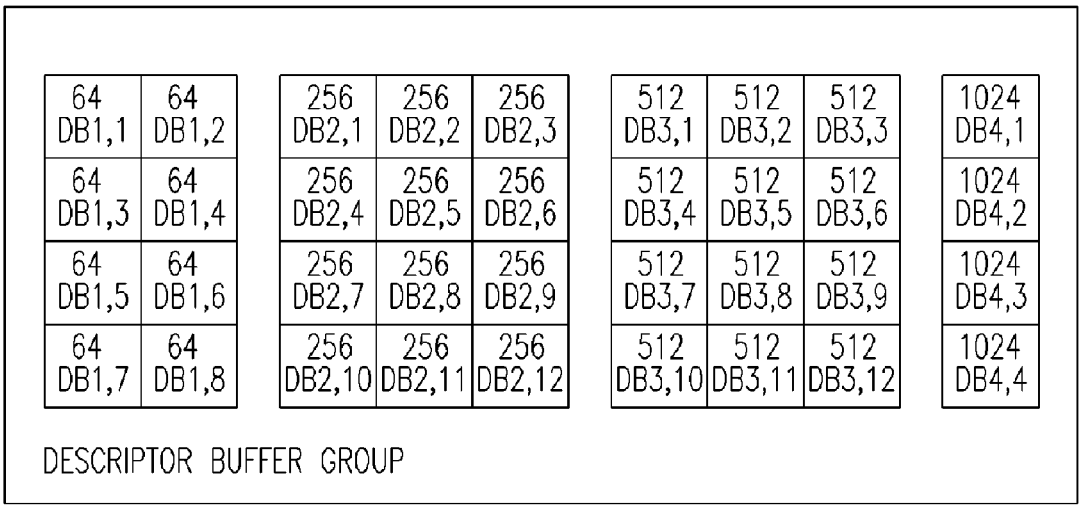

Please refer to FIGS. 3~5 for detailed description of the embodiments of the present invention. FIG. 3 shows a flow chart of flexible buffering according to an embodiment of the present invention. FIG. 4 shows initial states of a descriptor group and a descriptor buffer group. FIG. 5 shows reallocated states of the descriptor group and the descriptor buffer group.

As shown in FIG. 3, in step S31, M (wherein M is a natural number equal to or smaller than 6, for example, M=4) sets of descriptor buffers (hereinafter, "buffers") are allocated. It is preferred that the buffers are allocated from a socket buffer for preventing additional memory copy and increasing system performance.

In step S32, M descriptor sets are mapped to the M buffer sets. One example of initial states of the allocation and mapping of the descriptors and the buffers is shown in FIG. 4. As shown in FIG. 4, each descriptor set includes N (wherein N is a natural number, for example, N=9) chained descriptors, wherein the last one is chained to the first one to form a "ring". The first descriptor set includes 9 chained descriptors, D 1,1, D 1,2, D 1,3, D 1,4, D 1,5, D 1,6, D 1,7, D 1,8 and D 1,9. The second descriptor set includes 9 chained descriptors, D 2,1~D 2,9. The third descriptor set includes 9 chained descriptors, D 3,1~D 3,9. The fourth descriptor set includes 9 chained descriptors, D 4,1~D 4,9. Each buffer set is provided with N buffers of identical size, but buffers in different buffer set are of different sizes. For example, 1st buffer set is divided into 9 buffers of 64 bytes, DB 1,1, DB 1,2, DB 1,3, DB 1,4, D 1,5, DB 1,6, D 1,7, DB 1,8 and DB 1,9. The second buffer set is divided into 9 buffers of 256 bytes, DB 2,1~DB 2,9. The third buffer set is divided into 9 buffers of 512 bytes, DB 3,1~DB 3,9. The fourth buffer set is divided into 9 buffers of 1024 bytes, DB 4,1~DB 4,9. One descriptor points to one buffer. For example, the descriptor D 1,1 points to the buffer DB 1,1; the descriptor D 1,2 points to the buffer DB 1,2; . . . and the descriptor D 4,9 points to the buffer DB 4,9. Of course, initial states of the descriptors and buffers are not limited to 4 sets and 9 descriptors/buffers.

In step S33, the MAC controller is set and initialized. The setting of the MAC controller at least includes setting descriptor interrupt status registers (DISR) and buffer statistics usage counters (BSUC). One DISR is related to one descriptor set. DISR indicates whether a buffer pointed by the corresponding descriptor keeps the packets to be accessed. If there are four descriptor sets at the beginning, then four DISRs in the MAC controller are set and in a one-on-one relation to the four descriptor sets. The BSUCs count the usage times of each of the buffer sets; in other words, if a packet is buffered in DB 1,1 of the first buffer set, then a first BSUC counts one, or the count value of the first BSUC is updated/increased by 1. As shown in FIG. 4, if there are four buffer sets at the beginning, then four BSUCs in the MAC controller are set in one-on-one relation to the four buffer sets. In initialization, values of the BSUCs are set to zero.

In step S34, set and initialized, the MAC controller is ready to receive incoming packets. After packets are received and stored in the FIFO inside the MAC controller, the MAC controller classifies and buffers the incoming packets in the descriptor buffer group in the main memory based on the packet size. The MAC controller recognizes the packet size from the header of the incoming packets. The classifying and buffering criteria are as follows. If the packet size$\leq$64 bytes, the packet is buffered in the first buffer set in which each buffer is 64 bytes. If 64 bytes<packet size$\leq$256 bytes, the packet is buffered in the second buffer set in which each buffer is 256 bytes. If 256 bytes$\leq$packet size$\leq$512 bytes, the packet is buffered in the third buffer set in which each buffer is 512 bytes. If the packet size>512 bytes, the packet is buffered in the fourth buffer set in which each buffer is 1,024 bytes. After the incoming packets are buffered in appropriate buffers, the corresponding BSUC is updated.

For example, after the MAC controller is set up and initialized, if a packet of 200 bytes is input, the MAC controller buffers the input packet in DB 2, 1 of the second buffer set and value of the second BSUC is updated from zero to 1. Then, if a packet of 50 bytes is input, the MAC controller buffers the input packet in DB 1, 1 of the first buffer set and value of the first BSUC is updated from zero to 1.

When the packets are moved to the buffer by the MAC controller, the processor receives an interrupt command and jumps to an ISR (interrupt service routine), as shown in step S35.

In step S36, ISR checks whether the DISR is set. If a DISR is set, which means there are remaining packets buffered in buffers pointed by the descriptor corresponding to the set DISR, then the processor accesses the remaining packets in the buffers and clears an Own Bit in the corresponding descriptor. The Own Bit indicates whether the buffer pointed by the descriptor is empty. If the Own Bit is cleared (for example, "0"), the buffer is empty and the descriptor is available. If the Own Bit is set (for example, "1"), the buffer is buffered by the incoming packets.

After receiving multiple packets, the MAC controller may be in an idle state, which means there are no incoming packets for a while. Before entering into an idle state, it is checked whether any packets remain in every buffer. If there is no remaining packet, the MAC controller enters into an idle state. If some packets remain in the buffers, the processor keeps on accessing those remaining packets. In an idle state, the MAC controller calculates usage times/rates of each buffer set based on BSUC, as shown in step S37, and then recalculates each descriptor amount of each descriptor set (or each buffer amount of each buffer set) based on the usage times/rates, as shown in step S38.

The MAC controller calculates the descriptor amounts in descriptor sets (or buffer amounts in buffer sets) by the following equation:

$$Nk\_r = (N1\_p + N2\_p + N3\_p + N4\_p + \ldots NM\_p) * Uk \quad (1)$$

wherein k=1~M; Nk_r refers to updated descriptor amounts of k-th descriptor sets or updated buffer amounts in k-th buffer sets; Nk_p refers to the original descriptor amounts of k-th descriptor sets or original buffer amounts in k-th buffer sets; and Uk refers to the usage rates of k-th buffer sets.

Taking FIG. 4 for an example, four buffer sets, each of which has nine buffers, is shown; that is, k=4 and N1_p=N2_p=N3_p=N4_p=9. Assuming in an idle state, the values of four BSUCs are 100, 150, 150 and 50, respectively. The usage rates of four buffer sets are respectively U1=22% (or 2/9), U2=33% (or 1/3), U3=33% (or 1/3) and U4=11% (or 1/9). By equation (1), $$N1\_r = (9+9+9+9) * 22\% = 8 \quad (2)$$

$$N2\_r = (9+9+9+9) * 33\% = 12 \quad (3)$$

$$N3\_r = (9+9+9+9) * 33\% = 12 \quad (4)$$

$$N4\_r = (9+9+9+9) * 11\% = 4 \quad (5)$$

Then, it is confirmed again that there are no packets remaining in every buffer, as shown in step S39. If some packets still remain in the buffers, the processor keeps on accessing packets, as shown in step S40. If no packets remain, the MAC controller is disabled for a while. When the MAC controller is disabled, incoming packets are blocked, if any, as shown in step S41.

The MAC controller re-allocates or releases descriptor and buffers based on the updated descriptor amounts and buffer amounts, as shown in step S42. By above equations (2)~(5), after being re-allocated or released, eight descriptors D 1,1~D 1,8 are contained in the first descriptor set; twelve descriptors D 2,1~D 2,12 are contained in the second descriptor set; twelve descriptors D 3,1~D 3,12 are contained in the third descriptor set; and four descriptors D 4,1~D 4,4 are contained in the fourth descriptor set. Similarly, after the rearrangement, eight buffers DB 1,1~DB 1,8 are contained in the first buffer set; twelve buffers DB 2,1~DB 2,12 are contained in the second buffer set; twelve buffers DB 3,1~DB 3,12 are contained in the third buffer set; and four buffers DB 4,1~DB 4,4 are contained in the fourth buffer set. FIG. 5 shows re-allocated states of the descriptor group and the descriptor buffer group as discussed above.

It is noted that, after calculation by equation (1), if the updated descriptor (or buffer) amount is 0, it is recommended the updated descriptor (or buffer) amount be set as 1, instead of 0.

After the rearrangement of descriptors and buffers, the four BSUCs are all cleared, or values of four BSUCs are reset as 0, and the MAC controller are reset, as shown in step S43. Then, it is checked whether the networking system is still at work, as shown in step S44. If yes, the process returns to step S34 as shown in step S45. If not, the process ends.

For better performance, it is preferred that the descriptor buffer group is allocated from socket buffers.

Figure 6:
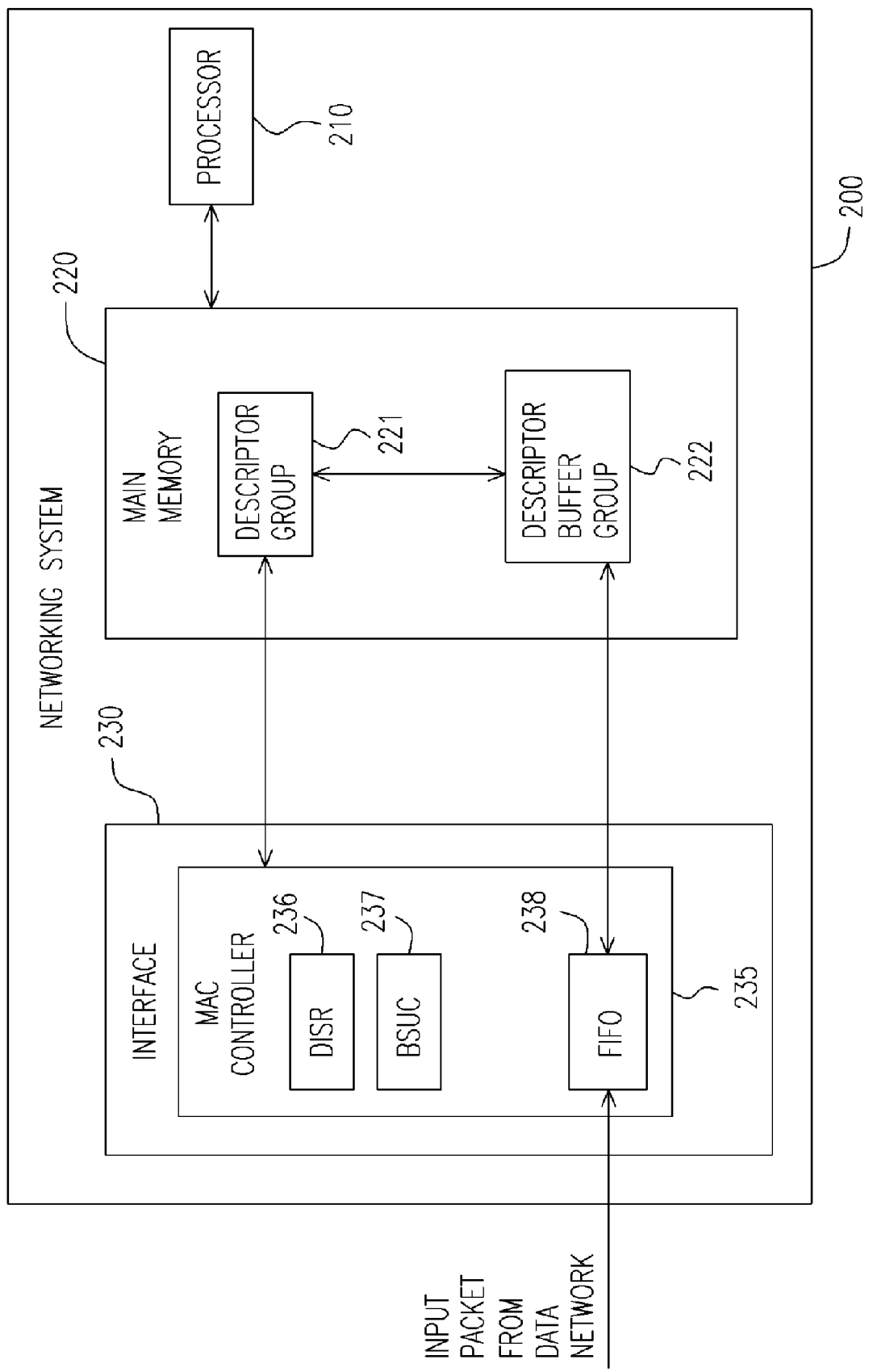
FIG. 6 shows a block diagram of a networking system for flexible buffering according to an embodiment of the present invention.

FIG. 6 shows a block diagram of the networking system for flexible buffering according to an embodiment of the present invention. As shown in FIG. 6, the networking system 200 includes a processor 210, a main memory 220 allocated with the descriptor group 221 and the descriptor buffer group 222, and a MAC controller 235 with a DISR 236, a BSUC 237 and an FIFO buffer 238.

As discussed above, in the present invention, amounts of descriptors and buffers are flexibly updated based on the previous usage times/rates of buffers, to increase system performance. After update, buffer set with more access/usage times/rates contains more buffers, and vice versa. Besides, by allocating several buffer sets with buffers of different bytes, the memory waste of buffer is reduced and the descriptor fetch cycles may be lowered because incoming packets are buffered into buffers with appropriate size.

The networking system includes, for example but not limited to, a computer system with a network interface card (NIC), an embedded system with networking access, a router, a switch, a home appliance with networking access, a wireless PDA (personal digital assistant), a cellular phone with networking access, a firewall device, a gateway and other similar devices with networking access.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for flexible buffering in a networking system, comprising:

allocating a first buffer set having a first number of buffers and a second buffer set having a second number of buffers, wherein each buffer in the first buffer set has a first equal size, each buffer in the second buffer set has a second equal size, the first equal size and the second equal size are different;

allocating a first descriptor set and a second descriptor set with first and second descriptors pointing to the buffers in the first and second buffer sets;

buffering an input packet into a buffer in one of the first and second buffer sets based on a packet size;

counting a first usage rate of the first buffer set and a second usage rate of the second buffer set;

re-calculating descriptor amounts in the first and second descriptor sets and the buffer amounts in the first and second buffer sets based on the first and the second usage rates; and re-allocating or releasing the descriptors in the first and second descriptor sets and the buffers in the first and second buffer sets based on the re-calculated descriptor amounts and buffer amounts.

2. The method of claim 1, wherein the first and second buffer sets are allocated from a socket buffer in a main memory of the networking system.

3. The method of claim 1, wherein the step of counting the first and the second usage rates comprises:
   updating the first usage rate when the input packet is buffered in the first buffer set; and
   updating the second usage rate when the input packet is buffered in the second buffer set.

4. The method of claim 1, further comprising:
   accessing the input packet from one of the buffers; and
   clearing an own bit in the descriptor pointing to the one of the buffers.

5. The method of claim 1, wherein the networking system is selected from a group comprising a computer system with a network interface card (NIC), an embedded system with networking, a router, a switch, a home appliance with networking, a wireless PDA (personal digital assistant), a cellular phone with networking, and a firewall device and a gateway.

6. A networking system for receiving packets, comprising:
   a main memory, allocated with a first buffer set having a first number of buffers and a second buffer set having a second number of buffers, wherein each buffer in the first buffer set has a first equal size, each buffer in the second buffer set has a second equal size, the first equal size and the second equal size are different, the main memory further allocates a first descriptor set and a second descriptor set with first and second descriptors pointing to the buffers in the first and second buffer sets; and
   a networking controller, receiving and buffering an input packet into a buffer in one of the first and second buffer sets based on a packet size;
   wherein when the networking system is idling, descriptor amounts in the first and second descriptor sets and the buffer amounts in the first and second buffer sets are recalculated based on usage rates of the first and the second buffer sets, the descriptors in the first and second descriptor sets and the buffers in the first and second buffer sets are re-allocated or released based on the recalculated descriptor and buffer amounts.

7. The networking system of claim 6, wherein the first and second buffer sets are allocated from a socket buffer in the main memory.

8. The networking system of claim 6, wherein the networking controller comprises a first counter and a second counter for updating the usage rates when the input packet is buffered in one of the first and second buffer sets.

9. The networking system of claim 6, further comprising a processor for accessing the input packet from the buffer and clearing an own bit in the descriptor pointing to the buffer.

10. The networking system of claim 6, wherein the networking system is selected from a group comprising a computer system with a network interface card (NIC), an embedded system with networking access, a router, a switch, a home appliance with networking access, a wireless PDA (personal digital assistant), a cellular phone with networking access, and a firewall device and a gateway.

11. A networking interface in a networking system with a main memory, receiving and moving packets to the main memory, the main memory allocated with a first buffer set having a first number of buffers and a second buffer set having a second number of buffers and a first and a second descriptor sets with descriptors pointing to the buffers of the first and the second buffer sets, the networking interface comprising:
   a networking controller, receiving and buffering an input packet into a buffer in one of the first and second buffer sets based on a packet size, the networking controller comprising:
      a status register, indicating whether packets are stored in the buffers; and
      a counter, counting the usage rates of the buffers in the first and second buffer sets;
   wherein each buffer in the first buffer set has a first equal size, each buffer in the second buffer set has a second equal size, the first equal size and the second equal size are different, the networking controller re-calculates descriptor amounts in the first and second descriptor sets and buffer amounts in the first and second buffer sets based on the usage rates counted by the counter; and the networking controller re-allocates or releases the descriptors in the first and second descriptor sets and the buffers in the first and second buffer sets based on the re-calculated descriptor amounts and buffer amounts.

12. The networking interface of claim 11, wherein the networking system further comprises a processor for accessing packets from the buffer and clearing an own bit in the descriptor pointing to the buffer.

13. The networking interface of claim 11, wherein the networking system is selected from a group comprising a computer system with a network interface card (NIC), an embedded system with networking access, a router, a switch, a home appliance with networking access, a wireless PDA (personal digital assistant), a cellular phone with networking access, a firewall device and a gateway.

* * * * *